United States Patent [19]

Kortbeek et al.

[11] 4,192,774

[45] Mar. 11, 1980

[54] PREPARATION OF AN ACTIVE TICL$_3$ CATALYST

[75] Inventors: Andras G. T. G. Kortbeek; Adrianus A. van der Nat, both of Amsterdam, Netherlands

[73] Assignee: Shell Oil Company, Houston, Tex.

[21] Appl. No.: 4,435

[22] Filed: Jan. 18, 1979

[30] Foreign Application Priority Data

Jan. 27, 1978 [GB] United Kingdom ................. 3377/78

[51] Int. Cl.$^2$ ................................................. C08F 4/64
[52] U.S. Cl. ............................... 252/429 B; 526/139; 526/140; 526/141; 526/142
[58] Field of Search ..................................... 252/429 B

[56] References Cited

U.S. PATENT DOCUMENTS

| | | | |
|---|---|---|---|
| 3,864,278 | 2/1975 | La Heit et al. | 252/429 B |
| 3,919,180 | 11/1975 | Furukawa et al. | 252/429 B X |
| 4,110,248 | 8/1978 | Sandis et al. | 252/429 B |

*Primary Examiner*—Patrick Garvin

[57] ABSTRACT

A process for the preparation of an active TiCl$_3$ catalyst which comprises:

(a) reacting TiCl$_4$ with a complexing agent in a molar ratio of from 1:0.3 to 1:2;

(b) reacting an organo-aluminum compound with a complexing agent in a molar ratio of at most 1:0.25;

(c) reducing the complexed TiCl$_4$ with the complexed organo-aluminum compound over a period of less than one hour at a temperature within the range 60° to 110° C. to produce TiCl$_3$ particles having an average particle size of from 50 to 500 μm;

(d) subjecting the TiCl$_3$ particles to a treatment to reduce the average particle size thereof to less than 50 μm, and (e) classifying the TiCl$_3$ particles to separate a fraction having an average particle size of from 0.1 to 30 μm.

4 Claims, No Drawings

PREPARATION OF AN ACTIVE TICL3 CATALYST

This invention relates to a process for the preparation of an active catalyst, which may be used for the stereospecific polymerization of alpha-olefins.

It is well known that titanium tetrachloride (TiCl4) can be reduced with an organo-aluminum derivative to give beta-TiCl3. This form of TiCl3 is generally known to be unsuitable for the stereospecific polymerization of alpha-olefins to give desirable high yields of polymers having an adequate, high isotacticity. Beta-TiCl3 is therefore converted to a more active form, usually delta- or gamma-TiCl3, by means of a heat treatment at a temperature up to 250° C., for example, 150° to 200° C. It is desirable to maintain the elevated temperature conditions for a sufficient period of time to ensure adequate conversion to the active form. Such active TiCl3 may also be prepared directly by reducing TiCl4 with an alkyl aluminum compound at an elevated temperature, for example 150° to 200° C., e.g., using certain ethers as the reaction medium.

It is observed, however, that at the elevated temperatures generally used for these preparations, the crystallites of active TiCl3 tend to grow in size; this means that the catalytic surface area per gram TiCl3 and hence the catalytic activity will decrease gradually. The rate of crystallite growth depends on the time and temperature conditions employed, i.e., the longer the exposure and the higher the temperature, the greater will be the reduction in catalytic activity, "activity" being used herein as referring to in the combined ability to produce an attractive high yield of polymer per gram of catalyst and to produce polymer having an adequate, high degree of isotacticity.

A number of substances have been found to catalyze the conversion of beta to more active forms of TiCl3 so that the conversion may be completed more rapidly and/or at lower temperatures. Examples of such substances are organic halides and TiCl4. A particular method of preparing an active TiCl3 employing a TiCl4-catalyzed conversion is described in U.K. patent specification No. 1,391,067. In this method beta-TiCl3 is prepared by a low temperature reduction of TiCl4 with an organo-aluminum compound, then washed with a complexing agent and finally converted to the active form in the presence of TiCl4, preferably at a temperature between 20° and 120° C. This process involves at least two separate basic steps, i.e., a reduction step at ambient temperature or below and a conversion step at higher temperatures up to 120° C.

It is possible to achieve the direction formation—i.e. in one basic reduction step—of active TiCl3 at temperatures similar to those employed in the staged reduction/conversion process described hereinbefore and lower than those employed hitherto in direct formation processes when reducing TiCl4 with an organo-aluminum compound while respecting the following conditions:

(a) the TiCl4 is premixed with a complexing agent, the molar ratio complexing agent: TiCl4 being within the range from 0.3:1 to 2:1;

(b) the organo-aluminum compound is premixed with a complexing agent, the molar ratio complexing agent: organo-aluminum compound being greater than 0.25:1, and (c) the reduction is carried out over a period of less than one hour at a temperature within the range 60° to 110° C.

The active TiCl3 obtained in such a direct formation process has an excellent catalytic activity both in terms of polymer yield and stereospecificity. However, the TiCl3 particles so produced tend to have a rather wide particle size distribution and a non-uniform geometrical shape.

It is the object of the present invention to overcome the latter disadvantage, hence, to provide a direct formation process leading to a catalyst which has an improved morphology. The invention is concerned with a process for the preparation of an active TiCl3 catalyst for the polymerization of alpha-olefins which comprises:

(a) reacting TiCl4 with a complexing agent in a molar ratio of from 1:0.3 to 1:2;

(b) reacting an organo-aluminum compound with a complexing agent in a molar ratio of at most 1:0.25;

(c) reducing the complexed TiCl4 with the complexed organo aluminum compound over a period of less than one hour at a temperature within the range 60° to 110° C. to produce TiCl3 particles having an average particle size of from 50 to 500 μm;

(d) subjecting the TiCl3 particles to a treatment to reduce the average particle size thereof to less than 50 μm, and (e) classifying the TiCl3 particles to separate a fraction having an average particle size of from 0.1 to 30 μm.

The term "average particle size" as used herein refers to that particle size in a particle size distribution diagram determined by sieve analysis that divides the sample in two equal weight proportions having smaller, respectively larger particle sizes that the average value (i.e. 50%wt of the total sample passing the sieve corresponding to the average particle size).

The term "complexing agent" as used herein means a compound capable of forming a complex with titanium and/or aluminum atoms. The complexing agent contains one or more atoms or groups which have one or more free electron pairs which will produce coordination with the metal. Atoms having one or more free electron pairs include the atoms of non-metals of Groups 5a and 6a of the Periodic Table, for example, oxygen, sulphur, nitrogen, phosphorus, antimony and arsenic. Examples of compounds containing such atoms are ethers, thioethers, thiols, phosphines, stibines, arsines, amines, amides, ketones and esters.

Preferably, the complexing agent is a compound of one of the following general formulae:

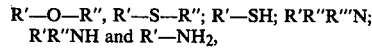

in which each of the groups R', R" and R''' is an alkyl, aryl, arylalkyl, alkylaryl or cycloalkyl group of up to 15 carbon atoms. Particularly preferred complexing agents are dialkyl ethers of the general formula R'—O—R', in which each R'—group is an alkyl group of 2 to 8 carbon atoms, for example n-butyl.

The complexing agent with which the TiCl4 is reacted may be the same as or different from that with which the organo-aluminum compound is reacted. The preferred range for the molar ratio TiCl4: complexing agent is from 1:0.5 to 1:1.5, in particular from 1:0.7 to 1:1.5. The preferred range for the molar ratio organo-aluminum compound: complexing agent is from 1:0.5 to 1:1.5 with the use of equimolar portions of the two components being particularly preferred.

The organo-aluminum compound is preferably an aluminium alkyl derivative of empirical formula:

$$Al\ R_nX_{3-n}$$

in which R is an alkyl group of 2 to 12, preferably 2 to 6 carbon atoms, for example ethyl; X is a hydrogen atom or halogen, preferably chlorine, atom; and n has a value from 0.1 to 3, preferably from 1.5 to 3. Particularly preferred aluminum alkyl derivatives are triethylaluminium and diethylaluminum chloride.

The relative amounts of $TiCl_4$ and the organo-aluminum compound used are preferably such that substantially all of the latter is consumed during the reduction. In the case of trialkylaluminum compounds this means that the molar ratio $TiCl_4$: aluminum compound is preferably at least the stoichiometric ratio of 3:1.

The reactions of the complexing agent with $TiCl_4$ and/or the reaction of complexing agent and organo-aluminum compound and the following reduction of $TiCl_4$ may be carried out in the presence of an inert organic diluent, e.g., an aliphatic, alicyclic and/or aromatic hydrocarbon. Preferred aliphatic or alicyclic diluents are optionally chlorinated alkanes or cycloalkanes of up to 12 carbon atoms. The concentrations of $TiCl_4$ and organo-aluminum compound respectively in their respective liquid systems may vary within wide limits, usually these are chosen to give a final concentration of reduced $TiCl_3$ of at least 0.2 mol./liter, preferably from 0.3 to 1.0 mol/liter.

As mentioned above the reduction is carried out over a period of less than one hour. The reduction period is determined by the time taken to add one reactant completely to the other. This addition time may be varied widely within the required range, for example, from 1 to 45 minutes. The temperature of the reduction is between 60° and 110° C. Preferred temperatures are from 70° to 90° C. The stereospecific properties of the active $TiCl_3$ may be further improved by maintaining the $TiCl_3$ at the reduction temperature for some time, e.g., 10 to 60 min., after the addition of one reactant to the other has been completed.

The active $TiCl_3$ may be separated from the liquid reaction mixture, for example, by decantation or filtration, and may then be washed with an aliphatic, alicyclic and/or aromatic hydrocarbon.

The active $TiCl_3$ so obtained normally has the violet color of the gamma or delta crystallinic modification. However, a relatively minor proportion of the brown beta-modification may still be contained therein as well.

In order to obtain reduced $TiCl_3$ particles with an average particle size of from 50 to 500 μm, preferably from 100 to 250 μm, the reduction of the complexed $TiCl_4$ is preferably carried out while respecting one or more of the following conditions:

employing such volumes of diluent that the final $TiCl_3$ concentration is in between 0.20 and 0.75 mmol./l, preferably in between 0.25 and 0.40 mmol./l;

employing organic diluents comprising aliphatic and aromatic constituents—e.g., iso-octane and toluene—and adjusting the reduction period to the particular ratio of aliphatic to aromatic components employed, e.g., with a ratio of 0.32 the reduction period should preferably be chosen in between 15 and 30 minutes, with a ratio of 0.26 the period is preferably chosen in between 6 and 15 minutes and with a ratio of 0.18 the period is preferably chosen in between 1 and 6 minutes. At a ratio above 0.36 the selection of the reduction period is no longer critical and may have any value of from 1 to 60 minutes.

The following treatment to reduce the size of the $TiCl_3$ particles to an average value of less than 50 μm, preferably less than 25 μm, may be carried out in any suitable manner known per se, e.g., by subjecting a slurry of $TiCl_3$ particles in the organic diluent to excessive stirring yielding very high shear forces or by effecting high shear conditions in a centrifuging pump, or by mechanical treatment of $TiCl_3$ particles which have not or have been separated from the organic diluent. The latter is preferably effected by grinding the $TiCl_3$ particles in ball mill for a period of at least 1, preferably at least 4 hours, employing steel or glass balls or marble pebbles. Such treatments do not only effect a substantial reduction of the average size of the $TiCl_3$ particles but also render the geometrical shape of the particles more uniform. Preferably this shape approaches the spherical form as closely as possible.

The $TiCl_3$ particles which have been reduced in size are subsequently classified by any suitable manner known per se to separate a fraction having an average particle size of from 0.1 to 30 μm, preferably 1 to 15 and more particularly 3 to 10 μm. Particles which have a size above or below these ranges may be recycled into the preceding operation to reduce the size of the $TiCl_3$ particles, thus, the larger particles are then reduced to smaller ones to increase the production of the desired classified fraction and smaller ones are agglomerated in the size reduction operation to larger ones and so also increase the yield of the desired classified fraction. Suitable classifying techniques are for example staged centrifuging, staged filtering or staged decantation of a $TiCl_3$ slurry in an organic diluent and electrostatic precipitation of the particles which may be effected in the presence or absence of an organic diluent.

The invention also includes a process for the polymerization of alpha-olefins in which the $TiCl_3$ prepared according to the invention is used as catalyst together with an aluminum alkyl derivative, for example a trialkyl aluminum or dialkyl aluminum halide, as activator. The activator is preferably diethyl aluminum chloride. The molar ratio of the aluminium compound to $TiCl_3$ may be from 0.5:1 to 10:1, preferably from 2:1 to 5:1. The alpha-olefins which may be polymerized according to the invention are preferably olefins of up to 8 carbon atoms, for example, ethylene, propylene, 1-butene or 1-pentene. The invention is of particular interest for the homopolymerization of propylene and the copolymerization of ethylene and propylene.

The polymerization may be carried out using any of the conventional procedures. Thus, the polymerization may be carried out in an inert liquid diluent medium such as an aliphatic hydrocarbon, or, in the absence of a diluent, in the vapor phase or in the liquid olefin monomer. Polymerization temperatures may be from 20° to 90° C., preferably from 55° to 75° C. and pressures from 98 to 5000 kPa. The polymerization may also be carried out in the presence of substances which lower the molecular weight of the polymer, for example gaseous hydrogen, or substances which decrease the soluble (non-stereospecific) polymer content of the polymer, for example amine or phosphine derivatives.

The invention is illustrated further in the following Examples.

under conditions that lead directly, i.e., without subsequent grinding to small particles (runs 1 and 2).

TABLE

| Run | Ratio iso-octane toluene | Particle size TiCl$_3$ (μm) | Particle size TiCl$_3$ ground (μm) | Particle size TiCl$_3$ ground and classified (μm) | Polymerization activity | Polymer Xylene sol. (% w) | Polymer Bulk density (g/m) |
|---|---|---|---|---|---|---|---|
| 1* | 0.18 | 6–12 | — | — | 133 | 3.0 | 0.18 |
| 2* | 0.21 | 6–15 | — | — | 101 | 2.4 | 0.17 |
| 3* | 0.26 | 80–150 | — | — | 123 | 3.7 | 0.34 |
| 4  | 0.26 | 80–150 | 3–30 | 3–15 | 125 | 3.7 | 0.44 |
| 5* | 0.36 | 90–180 | — | — | 126 | 4.5 | 0.43 |
| 6  | 0.36 | 90–180 | 3–35 | 3–15 | 129 | 4.6 | 0.51 |

*comparative

EXAMPLES

The same basic method was used in all of these Examples. 200 mmol. titanium tetrachloride were dissolved in 200 ml toluene and 134 mmol. butyl ether were added to the stirred solution. The mixture was warmed to 80° C. and then a complex obtained by adding 33.4 mmol. triethyl aluminum to 33.4 mmol. dibutyl ether in varying volumes of iso-octane, was added over a period of 20 minutes. The reaction mixture was stirred for a further period of 20 minutes at the reduction temperature, and then cooled to 25° C. The particulate TiCl$_3$, which had a violet color in all experiments, was then filtered off, washed with iso-octane, dried, then slurried in iso-octane contained in a 0.5 l 3-necked flask (TiCl$_3$ concentration 5%wt). A magnetic stirring rod with a length of 2 cm was employed to grind the particles contained in the slurry to reduce their size. Stirring was effected at 300 rpm during 15 minutes. The TiCl$_3$ samples were then classified by staged decantation to remove the particles having a size above 15 μm.

For the purpose of comparison these experiments were repeated under identical conditions but for the grinding and classifying procedure.

The remaining TiCl$_3$ particles (<15 μm) were tested in homopolymerizations of propylene at 70° C. in the presence of 0.6%v hydrogen. Aluminum diethyl chloride (9 mmol.) was added to isooctane (1.5 l) at 70° C. in a 3-liter reactor, and to this mixture was added the TiCl$_3$ (1.7 mmol.). The reactor was then pressurized with propylene to 260 kPa. The reactor was maintained at 70° C. for 4 hours and then the pressure was released. Butanol was added to inactivate the catalyst and the polymer was washed first with 1% aqueous hydrochloric acid and then three times with water. The polymer suspension was then steam-distilled and the polymer was filtered off. The results of the polymerization experiment are also summarized in the following Table. The activity of the catalyst is expressed as grams polymer per gram TiCl$_3$ per hour per 100 kPa of propylene. The value of the xylene solubles is in each case the total amount of polymer which is soluble in xylene and represents the total amount of atactic material produced.

The Table shows that reducing the particle size and classifying the TiCl$_3$ sample effects a significant increase of the polymer bulk density and also that an unfavorable bulk density is obtained when reducing TiCl$_4$ to TiCl$_3$ The material produced according to this invention and referred to herein as active TiCl$_3$ is a polymerization catalyst component which, in combination with an appropriate aluminum alkyl compound as second catalyst component, is suitable for use as a highly active stereospecific alpha-olefin polymerization catalyst. The preparation of the active TiCl$_3$ which is subjected to size reduction according to this invention is described in greater detail in Belgian Pat. No. 856,418, published Jan. 4, 1978.

We claim:

1. In the preparation of an active TiCl$_3$ olefin polymerization catalyst component by reducing TiCl$_4$ with an organo-aluminum compound which comprises:
   (a) premixing TiCl$_4$ with a complexing agent in an inert organic solvent, the molar ratio complexing agent: TiCl$_4$ being within the range from 0.3:1 to 2:1;
   (b) premixing the organo-aluminum compound with a complexing agent in an inert organic solvent, the molar ratio complexing agent: organo-aluminum compound being at least 0.25:1;
   (c) carrying out the reduction to TiCl$_3$ and precipitation of TiCl$_3$ in a single step by combining at least one stoichiometric equivalent of TiCl$_4$ in the premixed composition of step (a) with one stoichiometric equivalent of the organo-aluminum compound in the premixed composition of step (b) over a period of less than one hour at a temperature within the range 60° to 110° C., resulting in a reaction mixture having a concentration of at least 0.2 moles/liter of TiCl$_3$ particles having an average particle size of 50–500 millimicrons, the improvement which comprises subjecting said TiCl$_3$ particles to size reduction treatment to reduce the average particle size to less than 50 millimicrons and classifying the resulting TiCl$_3$ particles to recover a fraction having an average particle size of about 0.1–30 millimicrons.

2. The process according to claim 1, wherein the treatment to reduce the size of the TiCl$_3$ particles comprises grinding in a ball mill.

3. The process according to claims 1 or 2, wherein the TiCl$_3$ particles are classified by staged decantation of a slurry of TiCl$_3$ particles in an organic diluent.

4. The process according to claims 1 or 2, wherein the TiCl$_3$ particles are classified by staged centrifugation of a slurry of TiCl$_3$ particles in an organic diluent.

* * * * *